(12) United States Patent
Okayama

(10) Patent No.: US 8,706,870 B2
(45) Date of Patent: Apr. 22, 2014

(54) REMOTELY MANAGED DEVICE

(75) Inventor: Masataka Okayama, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 13/524,442

(22) Filed: Jun. 15, 2012

(65) Prior Publication Data

US 2012/0259979 A1 Oct. 11, 2012

Related U.S. Application Data

(63) Continuation of application No. 12/620,820, filed on Nov. 18, 2009, now abandoned.

(30) Foreign Application Priority Data

Nov. 21, 2008 (JP) ................................ 2008-297936

(51) Int. Cl.
*G06F 15/173* (2006.01)

(52) U.S. Cl.
USPC ....................................................... 709/224

(58) Field of Classification Search
USPC ....................................................... 709/224
See application file for complete search history.

(56) References Cited

U.S. PATENT DOCUMENTS

| | | | | |
|---|---|---|---|---|
| 6,389,464 B1 * | 5/2002 | Krishnamurthy et al. | .... | 709/220 |
| 7,082,460 B2 * | 7/2006 | Hansen et al. | ................ | 709/220 |
| 7,152,099 B1 * | 12/2006 | Arens | ........................... | 709/220 |
| 7,240,106 B2 * | 7/2007 | Cochran et al. | ............... | 709/222 |
| 7,672,251 B2 * | 3/2010 | Chu et al. | ...................... | 370/252 |
| 7,881,226 B2 * | 2/2011 | Chen et al. | ..................... | 370/254 |
| 7,881,438 B2 * | 2/2011 | Cioffi et al. | .................... | 379/1.04 |
| 2005/0123027 A1 * | 6/2005 | Cioffi et al. | .................... | 375/222 |
| 2005/0271075 A1 * | 12/2005 | Cioffi et al. | .................... | 370/445 |
| 2006/0039486 A1 * | 2/2006 | Rhee et al. | ..................... | 375/260 |
| 2006/0085522 A1 * | 4/2006 | Spry | ............................. | 709/220 |
| 2006/0095565 A1 * | 5/2006 | Rhee et al. | ..................... | 709/224 |
| 2007/0220093 A1 | 9/2007 | Bracke et al. | | |
| 2008/0244057 A1 * | 10/2008 | Kojima | ......................... | 709/223 |
| 2008/0282268 A1 | 11/2008 | Liekens et al. | | |
| 2009/0064268 A1 * | 3/2009 | Straub et al. | .................. | 725/152 |

FOREIGN PATENT DOCUMENTS

JP 2010-530149 A 9/2010

* cited by examiner

*Primary Examiner* — Alicia Baturay
(74) *Attorney, Agent, or Firm* — Mattingly & Malur, PC

(57) ABSTRACT

A remote management server creates a data set-up instruction telegram to be sent to a remotely managed device. A control program extracts the data set-up instruction from the telegram, and outputs same to a communication control bundle. The communication control bundle outputs the data set-up instruction to a basic data management bundle. The basic data management bundle, based on the data set-up instruction, fetches the data to be set in the remotely managed device, and determines whether this data is basic data or extended data. If the data is basic data, the basic data management bundle executes this data set-up process. If the data is extended data, an extended data management bundle executes the data set-up process.

10 Claims, 6 Drawing Sheets

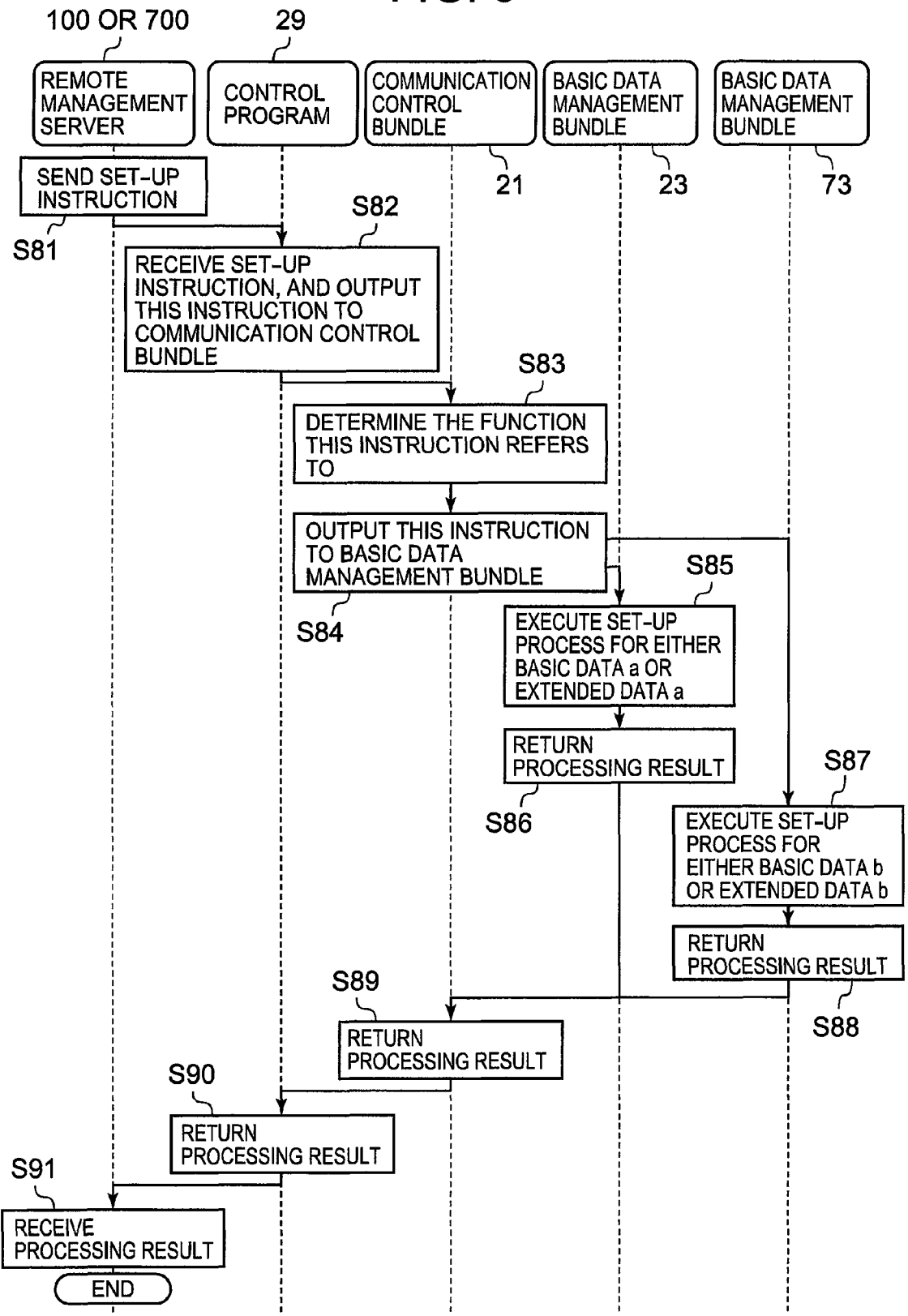

# REMOTELY MANAGED DEVICE

CROSS-REFERENCE TO PRIOR APPLICATION

This application is a continuation of U.S. patent application Ser. No. 12/620,820, filed Nov. 18, 2009, which relates to and claims the benefit of priority from Japanese Patent Application number 2008-297936, filed on Nov. 21, 2008 the entire disclosure of which is incorporated herein by reference.

BACKGROUND

The present invention generally relates to a remotely managed device the status of which is monitored from a remote location via a communication network.

In the past, there was proposed a remote management method that included a step for sending out a CWMP (CPE WAN Management Protocol) command, which requests a transport and/or dejitter layer configuration for managing a remotely managed device easily and with high reliability via a server located in a remote location from this device (for example, see Japanese Patent Application Laid-open No. 2008-536415). In the past, there was also proposed a remote management method, which relates to the configuration of data of a bundle (a program module that carries out a prescribed operation) that runs on an OSGi server platform, and which comprises a MA (Management Agent) that carries out communications with a RMS (Remote Management Server) using CWMP (for example, see US Patent No. 2007/0220093A1).

SUMMARY

The technologies respectively disclosed in the above-mentioned Japanese Patent Application Laid-open No. 2008-536415 and US Patent No. 2007/0220093A1 were proposed for the purpose of managing and maintaining from a remote location various types of devices that are coupled to a network (a communication network). Japanese Patent Application Laid-open No. 2008-536415 will be explained in more detail. Japanese Patent Application Laid-open No. 2008-536415 discloses a method and a video device corresponding to this method for carrying out a configuration (set-up, acquisition) in accordance with defining a data model that conforms to TR-106, and similarly using CWMP to access data expressed in accordance with the above-mentioned data model from a remotely located server coupled to the above-mentioned network (communication network). US Patent No. 2007/0220093A1 will be explained in more detail. In US Patent No. 2007/0220093A1, there is disclosed technology by which the above-mentioned configuration of the data of the bundle is carried out in accordance with providing a service object that conforms to TR-069/TR-106 so as to enable the above-mentioned bundle to carry out management via the above-mentioned MA using a TR-069-like service interface.

Incidentally, the management and maintenance of a device (network device) coupled to a communication network, such as the Internet, a carrier network, or a home network, using a server or other such information processing apparatus located in a remote location from this device by way of the above-mentioned communication network makes it possible to reduce the costs associated with dispatching maintenance personnel to the site and to reduce MTTR (Mean Time To Repair). That is, carrying out the settings for the above-mentioned network device from a remotely located server via the communication network does away with the need for maintenance personnel to go out to the location where the network device is installed. In addition to this, by constantly monitoring via the above-mentioned server the various data that is sent from the above-mentioned network device in accordance with the operation of the above-mentioned network device and rapidly discerning a failure that occurs in a network device, it also becomes possible to shorten the time required to recover from this failure.

The increasing number and advanced level of functions built into network devices in recent years has been remarkable. In accordance with this, the data that the server, which is located in a remote location from this network device, must manage (set-up, acquire) for the above-mentioned network device has also become more diverse in nature. It is also possible to assume that there are cases in which the management data will differ in accordance the application and environment in which this device is used even for the same kind of network device. Accordingly, with the foregoing in view, management data related to the above-mentioned network device must be systematized, and a configuration that facilitates the customization of this management data (i.e., the selection of management data for each of the above-mentioned network devices) must be established in advance.

However, although both Japanese Patent Application Laid-open No. 2008-536415 and US Patent No. 2007/0220093A1 disclose techniques for systematizing the management data related to the above-mentioned network device in accordance with using the data model that conforms to TR-106, neither Japanese Patent Application Laid-open No. 2008-536415 nor US Patent No. 2007/0220093A1 the discloses a technique for customizing this management data.

Therefore, an object of the present invention is to provide a remotely managed device, which, when management and maintenance tasks are being carried out from a remote location in a state in which the remotely managed device is coupled to a communication network, makes it possible to change the data that is being managed from the above-mentioned remote location with high reliability.

A remotely managed device in accordance with the present invention has its status monitored from a remote location via a communication network, and comprises a data/instruction storage unit that stores previously provided data and an instruction related to this data; a data/instruction checking unit, which, in a case where new data and an instruction related to this data have been sent from the above-mentioned remote location via the above-mentioned communication network, checks whether or not the above-mentioned newly sent data and instruction match the data and instruction stored in the above-mentioned data/instruction storage unit; and a processing operation execution unit, which in a case where a result of the above-mentioned check by the above-mentioned data/instruction checking unit has confirmed that the newly sent data and instruction match the stored data and instruction, executes a prescribed processing operation based on the above-mentioned newly sent data and instruction.

In a preferred embodiment related to the present invention, the data sent via the above-mentioned communication network from the above-mentioned remote location is basic data required for the remotely managed device to execute a basic processing operation and/or extended data required to extend functions of the above-mentioned remotely managed device.

In another embodiment that differs from the above, an information processing apparatus, which carries out communications with the above-mentioned remotely managed device via the above-mentioned communication network, is installed in the above-mentioned remote location, and the above-mentioned remotely managed device further comprises a communication coupling unit that couples to the above-mentioned information processing apparatus, in accordance with a prescribed protocol, to receive data and the instruction related to this data sent from the above-mentioned information processing apparatus.

In another embodiment that differs from the above, the above-mentioned prescribed protocol is the CWMP (CPE WAN Management Protocol).

Further, in another embodiment that differs from the above, respective functions of the above-mentioned data/instruction storage unit, the above-mentioned data/instruction checking unit, and the above-mentioned processing operation execution unit are realized in accordance with a basic data management bundle that has the above-mentioned basic data as a management target, and an extended data management bundle that has the above-mentioned extended data as a management target, which are programs installed in the remotely managed device and run on the OSGi service platform.

Further, in another embodiment that differs from the above, a plurality of the above-mentioned basic data management bundle and/or the above-mentioned extended data management bundle are installed.

Further, in another embodiment that differs from the above, the remotely managed device further comprises a data identification unit, which, in a case where the data sent from the above-mentioned information processing apparatus is the basic data, identifies which basic data management bundle manages the basic data, and in a case where the data sent from the above-mentioned information processing apparatus is the extended data, identifies which extended data management bundle manages the extended data.

Furthermore, in another embodiment that differs from the above, the above-mentioned information processing apparatus has the same configuration as the remotely managed device.

According to the present invention, it is possible to provide a remotely managed device, which, when management and maintenance tasks are being carried out from a remote location in a state in which the remotely managed device is coupled to a communication network, makes it possible to change the data that is being managed from the above-mentioned remote location with high reliability.

BRIEF DESCRIPTION OF THE DRAWINGS

FIG. 8 is a flowchart showing an example of processing operations in the respective processing programs shown in FIG. 7 when a remote management server related to another embodiment of the present invention carries out a data set-up with respect to the remotely managed device.

DETAILED DESCRIPTION OF THE EMBODIMENT

The embodiments of the present invention will be explained in detail below in accordance with the drawings.

Figure 1:
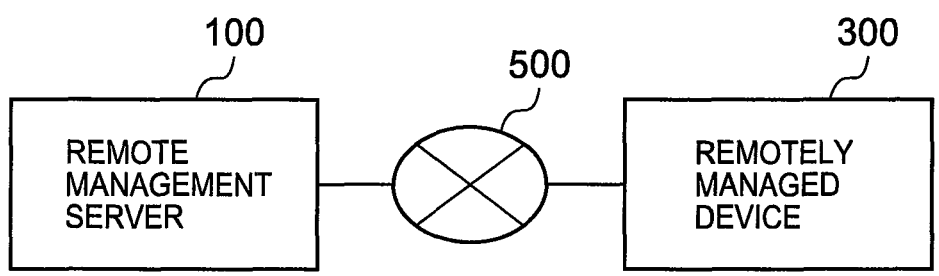
FIG. 1 is a functional block diagram showing an example of the overall configuration of a remote management system comprising a remotely managed device related to a first embodiment of the present invention.

FIG. 1 is a functional block diagram showing an example of the overall configuration of a remote management system comprising a remotely managed device related to the first embodiment of the present invention.

The above-mentioned remote management system, as shown in FIG. 1, is configured such that a remote management server 100 and a remotely managed device 300, which is the management target of this remote management server 100 and is installed in a remote location from this remote management server 100, are coupled via a communication network 500. The remote management server 100, for example, executes processing when setting basic data and extended data, and executes processing when acquiring the above-mentioned basic data and the above-mentioned extended data related to the remotely managed device 300 via the communication network 500 in accordance with a prescribed protocol, such as CWMP. In this embodiment, the remote management server 100 comprises the same internal configuration as the remotely managed device 300. The internal configuration of the remotely managed device 300 will be explained in detail below.

The communication network 500, for example, may be realized by any (communication) network that is configured from either a public communication network or a private communication network such as a home network, or from a combination of a public communication network and a private communication network. Furthermore, a public communication network, for example, is configured using a wired medium configured from fiber optics, CATV (Cable Television) or telephone lines, or a wireless medium. Further, a home network, which is an example of a private communication network, for example, is configured using a wired medium configured from communication cables, power lines, or internal phone lines, or a wireless medium.

Figure 2:
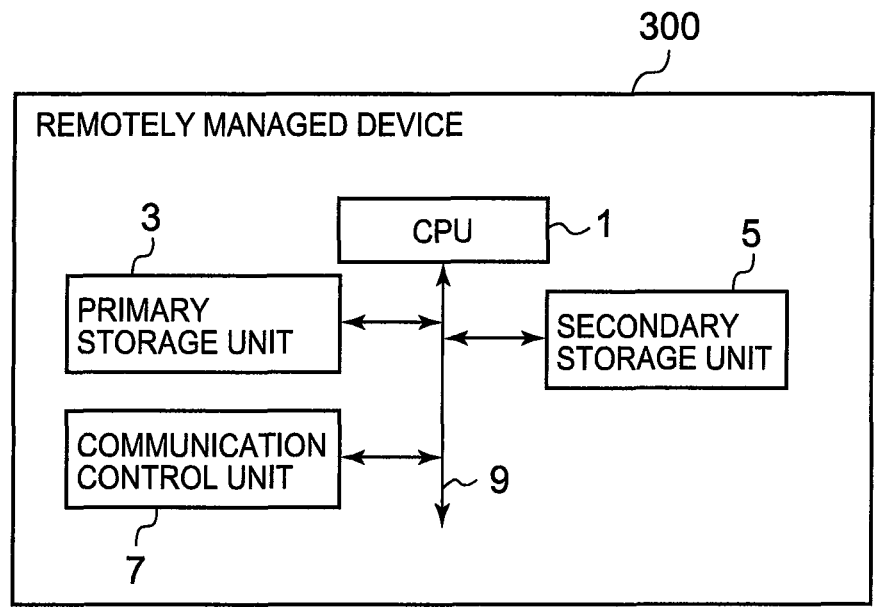
FIG. 2 is a functional block diagram showing an example of the internal configuration of the remotely managed device included in the remote management system disclosed in FIG. 1.

FIG. 2 is a functional block diagram showing an example of the internal configuration of the remotely managed device 300 included in the remote management system disclosed in FIG. 1.

The above-mentioned remotely managed device 300, as shown in FIG. 2, is equipped with a CPU (Central Processing Unit) 1, a primary storage unit 3, a secondary storage unit 5, and a communication control unit 7, and is configured such that these units (1, 3, 5, 7) are coupled via a bus line 9, which is laid inside the above-mentioned remotely managed device 300.

In this embodiment, the primary storage unit 3, for example, comprises both RAM (Random Access Memory) and ROM (Read Only Memory). RAM functions as a work area. ROM, for example, stores programs, such as various application programs, required for realizing the various functions of the remotely managed device 300. Various information provided from the CPU 1 via the bus line 9 is stored in the primary storage unit 3 under the control of the CPU 1. Further, in accordance with an information-read instruction being provided to the primary storage unit 3 from the CPU 1 via the bus line 9, information corresponding to this information-read instruction from among the various information stored in the primary storage unit 3 is outputted to the CPU 1 from the primary storage unit 3 via the bus line 9.

A program for controlling the processing operations of the remotely managed device 300 (i.e., a control program) is stored in the secondary storage unit 5. In this embodiment, for example, it is preferable that any of a HDD (Hard Disk Drive), an optical disk drive, a DVD (Digital Versatile Disc) drive, a Blue-Ray Disc drive, a CD-R (Compact Disc-Rewritable) drive, a magnetic medium drive (such as a floppy disk drive), or a MO (Magneto-Optical Disk) drive be used as the secondary storage unit 5. Besides the drives mentioned above, it is also possible to use a ROM, RAM or other such semiconductor storage device as the secondary storage unit 5. The secondary storage unit 5 stores various information provided from the CPU 1 via the bus line 9 in prescribed storage areas under the control of the CPU 1. In addition to this, in accordance with an information-read instruction provided to the secondary storage unit 5 from the CPU 1 via the bus line 9, the secondary storage unit 5 outputs information corresponding to this information-read instruction from among the stored information to the CPU 1 via the bus line 9.

The communication control unit 7, for example, sends and receives information (data) to and from other devices coupled via the network (the communication network 500) (shown in FIG. 1) in accordance with a prescribed protocol, such as TCP (Transmission Control Protocol) or UDP (User Datagram Protocol). In this embodiment, any of a modem, a network adapter, and a wireless transceiver device is used as the communication control unit 7. The communication control unit 7 sends various information and the like provided from the CPU 1 via the bus line 9 to the other devices (for example, the remote management server 100 shown in FIG. 1) coupled to the communication network 500 under the control of the CPU 1. Additionally, the communication control unit 7 also outputs various information and the like received from the other devices (for example, the remote management server 100 shown in FIG. 1) via the communication network 500 to the CPU 1 via the bus line 9.

The CPU 1, based on the program (control program) stored in the primary storage unit 3 and the secondary storage unit 5, controls the operations of the respective units configuring the remotely managed device 300 so as to demonstrate the various functions intrinsic to the remotely managed device 300.

Figure 3:
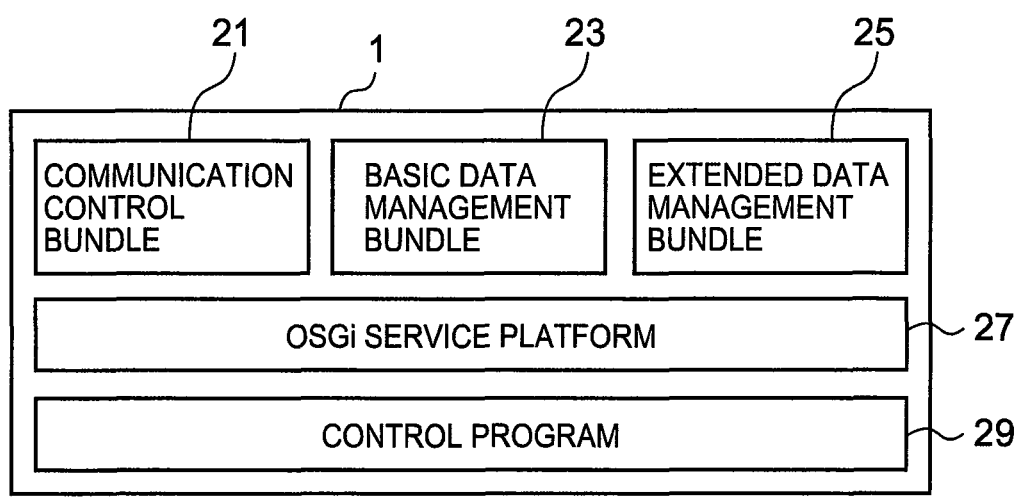
FIG. 3 is a diagram showing an example of the configuration of processing programs that run on the CPU disclosed in FIG. 2.

FIG. 3 is a diagram showing an example of the configuration of processing programs that run on the CPU 1 shown in FIG. 2.

The above-mentioned processing program, as shown in FIG. 3, at the least comprises a control program 29, a OSGi service platform 27, a communication control bundle 21, a basic data management bundle 23, and an extended data management bundle 25.

The control program 29 is a processing program, which carries out a function for mainly controlling the operation of the hardware (minimally, the primary storage unit 3, the secondary storage unit 5 and the communication control unit 7 shown in FIG. 2), is stored in the primary storage unit 3 or the secondary storage unit 5, and comprises at the least an OS (Operating System), a device driver, and a Java (registered trademark) virtual machine program. The control program 29 is executed in accordance with the CPU 1 on the primary storage unit 3. The control program 29 boots up when the remotely managed device 300 boots up (for example, when the drive power to the remotely managed device 300 is turned ON), and shuts down when the remotely managed device 300 shuts down (for example, when the drive power to the remotely managed device 300 is turned OFF).

The OSGi service platform 27 is a processing program for managing the life cycle, that is, the installation, boot-up, shutdown and uninstallation of a bundle, which is a specific processing program, and is stored in either the primary storage unit 3 or the secondary storage unit 5. As used here, installation, which is one portion of the life cycle of the above-mentioned bundle, refers to this bundle being stored in either the primary storage unit 3 or the secondary storage unit 5 of the remotely managed device 300 shown in FIG. 2. Further, boot-up, which is another portion of the life cycle of the above-mentioned bundle, refers to the execution of the above-mentioned bundle, which is stored in either the primary storage unit 3 or the secondary storage unit 5, being started by the CPU 1 on the primary storage unit 3. Further, shutdown, which is yet another portion of the life cycle of the above-mentioned bundle, refers to ending the execution of the above-mentioned bundle, which is stored in either the primary storage unit 3 or the secondary storage unit 5, and is being executed by the CPU 1 on the primary storage unit 3. Uninstallation, which is yet another portion of the above-mentioned bundle, refers to this bundle, which is being stored in either the primary storage unit 3 or the secondary storage unit 5, being deleted from either the primary storage unit 3 or the secondary storage unit 5 by the CPU 1. Furthermore, since a detailed description of the OSGi service platform 27 is disclosed in the above-mentioned US Patent No. 2007/0220093A1, an explanation will be omitted here. The OSGi service platform 27 is also booted up when the remotely managed device 300 is booted up and shut down when the remotely managed device 300 is shut down, the same as the control program 29. The OSGi service platform 27 is also executed by the CPU 1 on the primary storage unit 3 the same as the control program 29.

The communication control bundle 21 is also a kind of processing program the same as the control program 29 and the OSGi service platform 27, and is stored in either the primary storage unit 3 or the secondary storage unit 5. The communication control bundle 21, for example, performs the function of carrying out the communication of various information (data) to and from the other devices (for example, the remote management server 100 shown in FIG. 1) via the communication network 500 in accordance with a prescribed protocol, such as CWMP. Additionally, the communication control bundle 21 also performs the function of exchanging data with the basic data management bundle 23, which is stored in either the primary storage unit 3 or the secondary storage unit 5 the same as the communication control bundle 21. In a case where communications are carried out to and from the other devices (for example, the remote management server 100 shown in FIG. 1) via the communication network 500, the communication control bundle 21 carries out communications for exchanging the various information (data) with the above-mentioned other devices by controlling the communication control unit 7 shown in FIG. 2 via the control program 29. Furthermore, since a detailed description of the CWMP is disclosed in the above-cited Japanese Patent Application Laid-open No. 2008-536415, an explanation will be omitted here. The life cycle of the communication control bundle 21 is managed by the OSGi service platform 27. The communication control bundle 21 is also executed by the CPU 1 on the primary storage unit 3 the same as the control program 29 and the OSGi service platform 27.

The basic data management bundle 23 is also a kind of processing program the same as the control program 29, the OSGi service platform 27 and the communication control bundle 21, is stored in either the primary storage unit 3 or the secondary storage unit 5, and is executed by the CPU 1 on the primary storage unit 3. The basic data management bundle 23 performs the function of managing the basic data required for normally demonstrating the various functions intrinsic to the remotely managed device 300. Additionally, the basic data management bundle 23 also performs the function for exchanging data with the extended data management bundle 25, which is stored in either the primary storage unit 3 or the secondary storage unit 5 the same as this basic data management bundle 23. In a case where a basic data set-up instruction has been received from the communication control bundle 21, the basic data management bundle 23, for example, carries out the set-up process for this data by using the control program 29 and so forth. Further, in a case where a basic data acquisition instruction has been received from the communication control bundle 21, the basic data management bundle 23 acquires this data by using the control program 29 and so forth, and also delivers this data to the communication control bundle 21. The life cycle of the basic data management bundle 23 is also managed by the OSGi service platform 27 the same as the communication control bundle 21.

The extended data management bundle 25 is a processing program for performing a function that manages the extended data required to realize the various functions of the remotely managed device 300, and also for performing a function that exchanges data with the basic data management bundle 23. The extended data management bundle 25 is stored in either the primary storage unit 3 or the secondary storage unit 5, and is executed by the CPU 1 in the primary storage unit 3 the same as the control program 29, the OSGi service platform 27, the communication control bundle 21 and the basic data management bundle 23. In a case where an extended data set-up instruction has been received from the basic data management bundle 23, the extended data management bundle 25, for example, carries out the set-up process for this data by using the control program 29 and so forth. Further, in a case where an extended data acquisition instruction has been received from the basic data management bundle 23, the extended data management bundle 25 acquires this data by using the control program 29 and so forth, and also delivers this data to the basic data management bundle 23. The life cycle of the extended data management bundle 25 is also managed by the OSGi service platform 27 the same as the basic data management bundle 23 and the communication control bundle 21.

Figure 4:
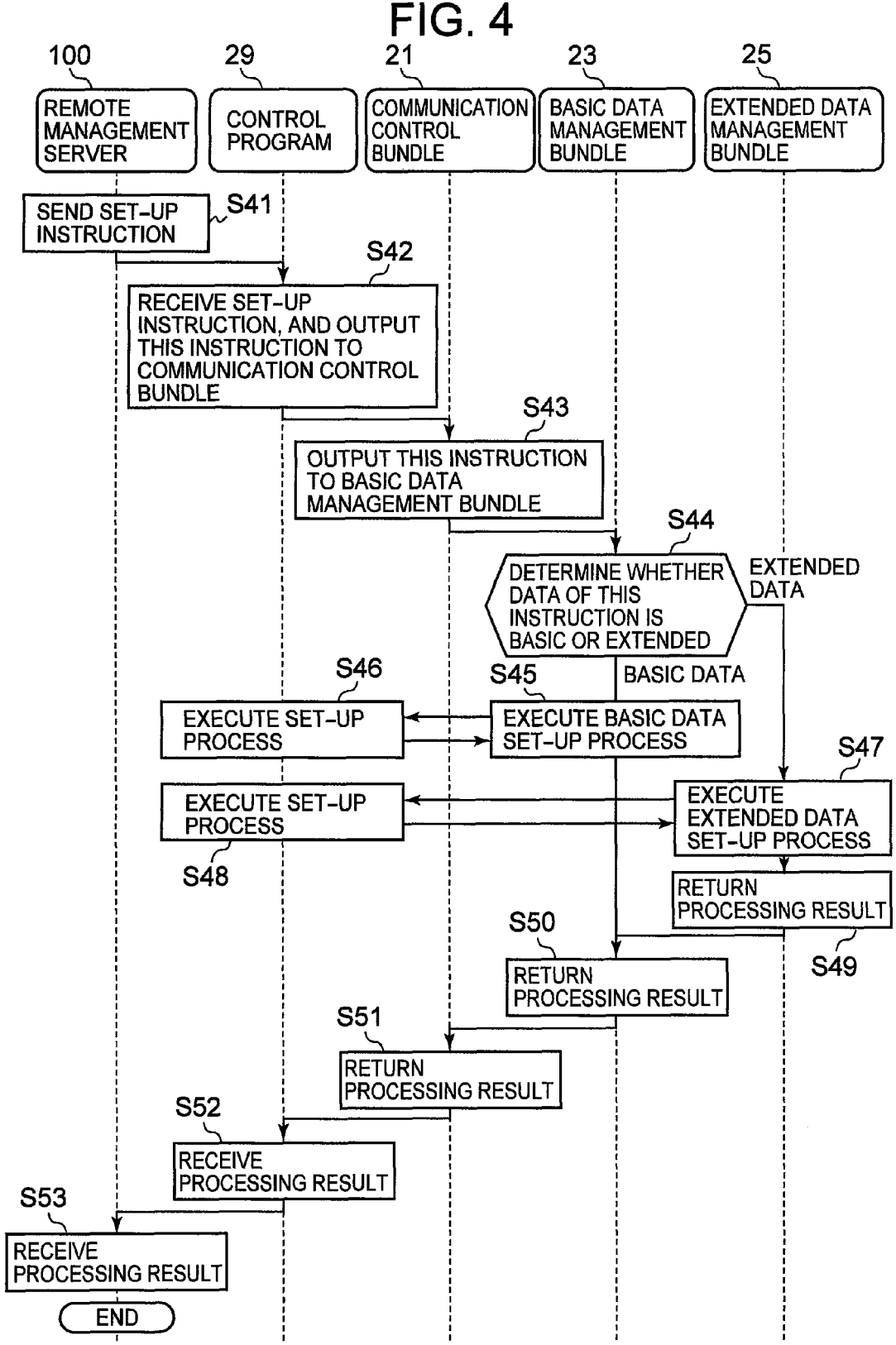
FIG. 4 is a flowchart showing an example of processing operations in the respective processing programs shown in FIG. 3 when a remote management server related to the first embodiment of the present invention carries out a data set-up with respect to the remotely managed device.

FIG. 4 is a flowchart showing examples of processing operations in the respective processing programs (21, 23, 25, 27, 29) shown in FIG. 3 when the remote management server 100 carries out a data set-up to the remotely managed device 300 related to one embodiment of the present invention.

In FIG. 4, first, the remote management server 100 creates a telegram for a data set-up instruction for the remotely managed device 300, and sends this data set-up instruction telegram (hereinafter, may also be expressed as the "data set-up instruction") to the remotely managed device 300 via the communication network 500 using the CWMP. It may be assumed that the trigger for the remote management server 100 to send the above-mentioned data set-up instruction to the remotely managed device 300 is an input of an instruction to this remote management server 100 by the operator of the remote management server 100, the automatic booting up of this remote management server 100 in accordance with a batch program, or an action response from the remotely managed device 300 as disclosed in the above-cited US Patent No. 2007/0220093A1 (Step S41).

Upon receiving the above-mentioned data set-up instruction telegram, the control program 29 extracts the above-mentioned data set-up instruction from the above-mentioned telegram, and also outputs this extracted data set-up instruction to the communication control bundle 21 (Step S42). When the above-mentioned data set-up instruction is inputted, the communication control bundle 21 outputs the above-mentioned data set-up instruction to the basic data management bundle 23 (Step S43).

When the above-mentioned data set-up instruction from the communication control bundle 21 is inputted, the basic data management bundle 23 fetches the data to be set in the remotely managed device 300 based on the above-mentioned data set-up instruction, and also determines whether this fetched data is basic data or extended data. In this embodiment, it is supposed that basic data, for example, is a data group that is managed as a Baseline Profile defined in TR-106, and that extended data is a data group that is managed as a Profile (a LAN Profile or a IPPing Profile) other than the above-mentioned Baseline Profile. That is, the above-mentioned determination process is for determining whether this data is data that is managed as the above-mentioned Baseline Profile, or data that is managed as a Profile other than the above-mentioned Baseline Profile. More specifically, the basic data management bundle 23 maintains a data group that is managed as the above-mentioned Baseline Profile, determines whether or not this data is included in the above-mentioned data group, and in a case where the result thereof is that this data is not included in the above-mentioned data group, outputs this data to the extended data management bundle 25 corresponding to the above-mentioned extended Profile (Step S44).

Alternately, in a case where the result of the determination in Step S44 is that this data is to be managed as the above-mentioned Baseline Profile, the basic data management bundle 23 executes the set-up process for this data in the remotely managed device 300 (Step S45). In a case where the basic data management bundle 23 uses the control program 29 when executing the above-mentioned set-up process, this data is outputted from the basic data management bundle 23 to the control program 29, and the control program 29 executes this data set-up process, and outputs the result of this set-up process to the basic data management bundle 23 (Step S46). In a case where the basic data management bundle 23 does not use the control program 29 in the set-up process of Step S45, the basic data management bundle 23 itself executes this data set-up process. For example, in a case where the basic data management bundle 23 maintains the URL setting of the remote management server 100 among the data managed as the above-mentioned Baseline Profile, there is no need to use the control program 29 at the time of the above-mentioned set-up process, and as such, the basic data management bundle 23 does not output this data to the control program 29.

When the basic data set-up process is executed in Step S45, the basic data management bundle 23 notifies the communication control bundle 21 of the result of this set-up process (Step S50), and when this notification is inputted, the communication control bundle 21 notifies the control program 29 of the result of this set-up process (Step S51). When this notification is inputted, the control program 29 creates a telegram related to the result of this set-up process, and sends the created telegram to the remote management server 100 via the communication network 500 (Step S52). The remote management server 100 receives this telegram and executes the prescribed processing operation, thereby ending the series of processing operations of the data set-up instruction related to the remotely managed device 300 shown in FIG. 4 (Step S53).

In a case where a determination has been made in the determination process of Step S44 that the above-mentioned data is not included in the above-mentioned data group, and the basic data management bundle 23 has outputted the above-mentioned data to the extended data management bundle 25, the extended data management bundle 25 inputs the above-mentioned data and executes the set-up process for this data (Step S47). In a case where the extended data management bundle 25 uses the control program 29 when executing this set-up process, this data is outputted from the extended data management bundle 25 to the control program 29, and the control program 29 executes this data set-up process and outputs the result of this set-up process to the extended data management bundle 25 (Step S48). In a case where the extended data management bundle 25 does not use the control program 29 in the set-up process of Step S47, the extended data management bundle 25 itself executes this data set-up process.

When the extended data set-up process is executed in Step S47, the extended data management bundle 25 notifies the basic data management bundle 23 of the result of this set-up process (Step S49). As described above, this notification is sent from the basic data management bundle 23 to the control program 29 via the communication control bundle 21 (Steps S50, S51), and the control program 29 creates a telegram related to the result of this set-up process and sends from the control program 29 the created telegram to the remote management server 100 (Step S52). Then, in accordance with receiving this telegram, the remote management server 100 executes the prescribed processing operation (Step S53) and ends the series of processing operations.

Now then, it is possible to install a plurality of the extended data management bundles 25 shown in FIG. 3 in the remotely managed device 300. For example, it is supposed that two of the above-mentioned extended data management bundles 25 are installed in the remotely managed device 300, and that it is possible to manage a data group managed by the LAN Profile in the one of these extended data management bundles 25, and to manage a data group managed by the IPPing Profile in the other one. In accordance with this, in a case where it has been determined by the basic data management bundle 23 in the determination process shown in Step S44 of FIG. 4 that this data is not included in the data group managed as the above-mentioned Baseline Profile, either of the extended data management bundles (25) will check which extended File (the LAN Profile or the IPPing Profile) is being managed. Then, upon singling out the extended data management bundle (25) that should manage this data based on the result of this check, the basic data management bundle 23 outputs this data to this extended data management bundle (25).

A method like that disclosed in the above-cited US Patent No. 2007/0220093A1, for example, is applicable as the technique by which either extended data management bundle (25) checks which extended File is to be managed here. That is, it is a technique in which the extended data management bundle (25) registers a service interface and the Profile name corresponding to this extended data management bundle (25) itself in a service registry provided by the OSGi service platform 27, and the basic data management bundle 23 checks this registered service interface.

As described above, even in a case where a plurality of extended data management bundles (25) are installed in the remotely managed device 300, two or more Profiles may be managed by one extended data management bundle (25). In accordance with this, the extended data management bundle (25) registers all the Profile names that this extended data management bundle (25) is supposed to manage in the service registry of the OSGi service platform 27.

In one embodiment of the present invention described using FIGS. 1 through 4, and in the example in which a plurality of extended data management bundles (25) are installed in the remotely managed device 300 as described above, the method for setting data in the remotely managed device 300 from the remote management server 100 has been explained using mainly the flowchart disclosed in FIG. 4. However, it is also possible for the remotely managed device 300 to realize the acquisition of data from the remote management server 100 in accordance with processing steps that are the same as the processing steps shown in the flowchart disclosed in FIG. 4.

Next, a change notification from the remotely managed device 300 to the remote management server 100 in a case where a change has occurred in the data (i.e., the basic data and the extended data) to be managed in the remotely managed device 300 will be explained.

In the following explanation, it is supposed that the basic data management bundle 23 shown in FIG. 3 comprises, from among the data group managed as the above-mentioned Baseline Profile, at the least data (for example, the URL, ID and password of the remote management server 100) that is required to communication with the remote management server 100.

Figure 5:
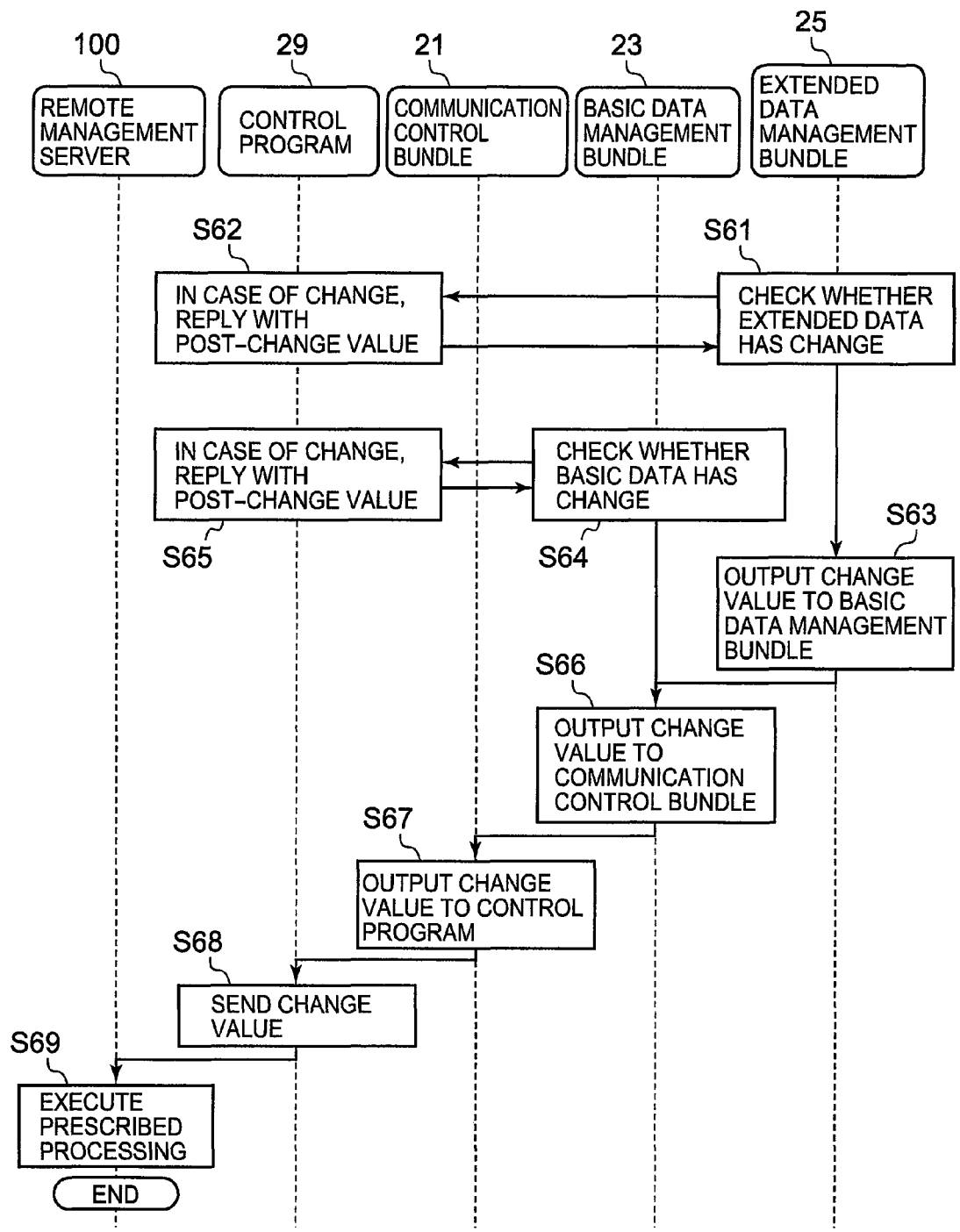
FIG. 5 is a flowchart showing a variation of the processing operations in the respective processing programs shown in FIG. 3 when a data change notification is sent from the remotely managed device to the remote management server.

FIG. 5 is a flowchart showing a variation of the processing operations in the respective processing programs shown in FIG. 3 when a data change notification is sent to the remote management server 100 from the remotely managed device 300.

In FIG. 5, first, the extended data management bundle 25 checks whether or not a change has occurred in the value of the extended data that this extended data management bundle 25 itself manages (Step S61). In a case where the control program 29 is used when executing this check process, the extended data management bundle 25 queries the control program 29 as to whether or not there is a change in the value of this extended data. When this query is inputted, the control program 29 checks whether or not a change has occurred in the value of the above-mentioned extended data, and outputs the result of this check to the extended data management bundle 25 (Step S62).

In a case where the control program 29 is not used in the check process in the above-described Step S61, the extended data management bundle 25 executes the check as to whether or not a change has occurred in the value of the above-mentioned extended data on its own (the extended data management bundle 25). In a case where the result of the check in Step S61 is that a change has occurred in the value of the above-mentioned extended data and there has been an output from the control program 29 in Step S62 to the effect that a change has occurred in the value of the above-mentioned extended data, the extended data management bundle 25 outputs to the basic data management bundle 23 a combination of the name of the data that has changed and the post-change value (Step S63).

Alternately, the basic data management bundle 23 also carries out a check, the same as the extended data management bundle 25, to determine whether or not a change has occurred in the value of the basic data that (the basic data management bundle 23) itself has as a management target (Step S64). In a case where the control program 29 is used when executing this check process, the basic data management bundle 23 queries the control program 29 as to whether or not there is a change in the value of the above-mentioned basic data. When this query is inputted, the control program 29 checks whether or not a change has occurred in the value of the above-mentioned basic data, and outputs the result of this check to the basic data management bundle 23 (Step S65).

In a case where the control program 29 is not used in the check process of the above-described Step S64, the basic data management bundle 23 executes a check as to whether or not a change has occurred in the value of the above-mentioned basic data on its own (the basic data management bundle 23). Furthermore, the check process in Step S61 and the check process in Step S64 described above are both respectively executed asynchronously as the result of a trigger event of one sort or another. The event that serves as the trigger by which the above-mentioned respective check processes are executed may be assumed, for example, to be the arrival of a prescribed time, or the passage of a prescribed period of time.

In a case where the result of the check in Step S64 is that a change has occurred in the value of the above-mentioned basic data, the basic data management bundle 23 outputs to the communication bundle 21 change data, which combines the name of the data that has changed and the post-change value, and the data (for example, the coupling-destination data, such as the URL, ID and password of the remote management server 100) that is required to communication with the remote management server 100 (Step S66). When the above-mentioned change data and the above-mentioned coupling-destination data are inputted, the communication control bundle 21 outputs these data to the control program 29 (Step S67). Upon inputting the above-mentioned data, the control program 29 creates a telegram related to the above-mentioned change data, and sends the created telegram to the remote management server 100 indicated by the above-mentioned coupling-destination data via the communication network 500 (Step S68). The remote management server 100 receives this telegram and executes the prescribed processing operation, thereby ending the series of processing operations related to the data change notification sent to the remote management server 100 from the remotely managed device 300 shown in FIG. 5 (Step S69).

Furthermore, in a case where the above-mentioned change data and the above-mentioned coupling-destination data related to the remote management server 100 from the extended data management bundle 25 to the basic data management bundle 23 has been outputted to the communication control bundle 21 in Step S63, the basic data management bundle 23 outputs these data to the communication control bundle 21 (Step S66), and the series of processing operations shown in FIG. 5 comes to an end by way of the processing steps respectively shown in the subsequent Step S67, Step S68 and Step S69 (Since these steps have been explained in detail above, a duplicate explanation will be omitted here).

As explained hereinabove, according to one embodiment of the present invention shown in FIGS. 1 through 4, and the variation of the processing operations of FIG. 3 shown in FIG. 5, it becomes possible to change the data to be managed in each individual device (remotely managed device 300) with high reliability without suspending the execution of the other bundles (for example, the remaining extended data management bundle (25) and the communication control bundle 21) in accordance with installing the basic data management bundle 23 and either 1 or 2 or more extended data management bundles (25) as shown in FIG. 3. Further, as described above, since the OSGi service platform 27 is able to manage the lifecycle of the extended data management bundle 25, the installation, boot-up, shutdown and uninstallation of the extended data management bundle 25 that manages a specific extended Profile are possible while the remotely managed device 300 is operating. Since these installation, boot-up, shutdown and uninstallation processes do not affect the execution of the basic data management bundle 23 or the other extended data management bundle(s) 25 (there is no need to suspend the processing operations of the basic data management bundle 23 and the other extended data management bundle(s) 25), it is possible to guarantee the availability essential for managing and maintaining a device (i.e., the remotely managed device 300) from a remote location and to enhance the reliability of the device (i.e., the remotely managed device 300).

Generally speaking, the network devices (i.e., the remotely managed device 300 and the remote management server 100) described above may possess two or more functions. For example, a device that is equipped with a home router (Internet Gateway Device) function and an STB (Set Top Box) function is such a device. Meanwhile, data models, such as TR-098 for use in home routers and TR-135 for use in STB, which conform to the TR-106 specification, are defined in the Broadband Forum (http://www.broadband-forum.org/technical/trlist.php). The technology related to the above-described one embodiment of the present invention and variation thereof may also be applied to devices equipped with two or more functions as described above (i.e., the remotely managed device 300 and the remote management server 100).

Figure 6:
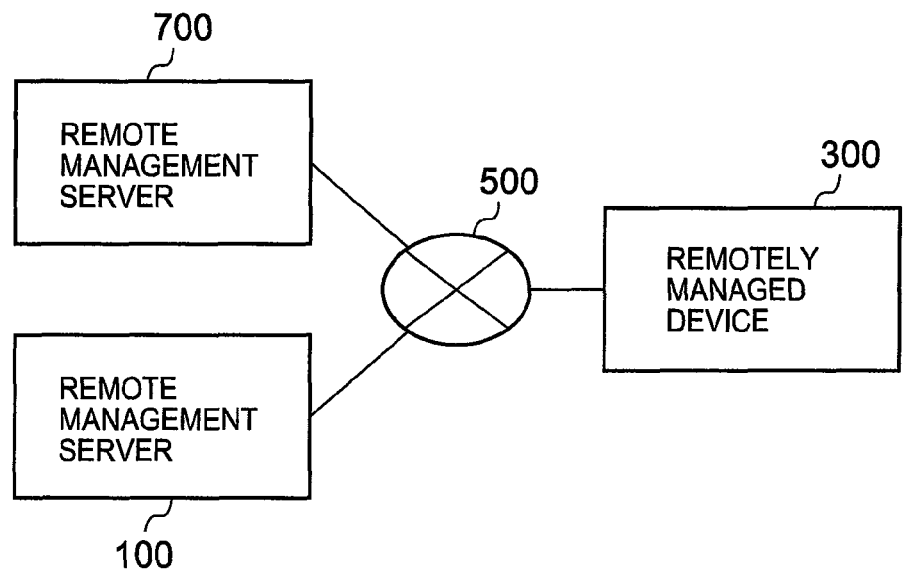
FIG. 6 is a functional block diagram showing an example of the overall configuration of a remote management system comprising a remotely managed device related to another embodiment of the present invention.

FIG. 6 is a functional block diagram showing an example of the overall configuration of a remote management system comprising a remotely managed device related to another embodiment of the present invention.

The configuration of the above-mentioned remote management system, as shown in FIG. 6, differs from that of the remote management system shown in FIG. 1 in that in addition to the device indicated by reference numeral 100 as the remote management server, the above-mentioned remote management system also comprises a device indicated by reference numeral 700. Since the rest of the configuration is the same as the shown in FIG. 1, components that are the same as those shown in FIG. 1 will be assigned the same reference numerals in FIG. 6, and detailed explanations of these components will be omitted.

Furthermore, in the above-mentioned remote management system, the remote management server 100 executes the set-up of a certain basic data (hereinafter, may also be expressed as the "first basic data") and a certain extended data (hereinafter, may also be expressed as the "first extended data") of the remotely managed device 300, and the acquisition of this first basic data and this first extended data in accordance with the same protocol (CWMP) as that in one embodiment of the present invention. Further, the remote management server 700 executes the set-up of a different basic data than the above-mentioned first basic data (hereinafter may also be expressed as the "second basic data") and a different extended data than the above-mentioned first extended data (Hereinafter, may also be expressed as the "second extended data") of the remotely managed device 300, and the acquisition of this second basic data and this second extended data in accordance with the above-mentioned protocol (CWMP).

Figure 7:
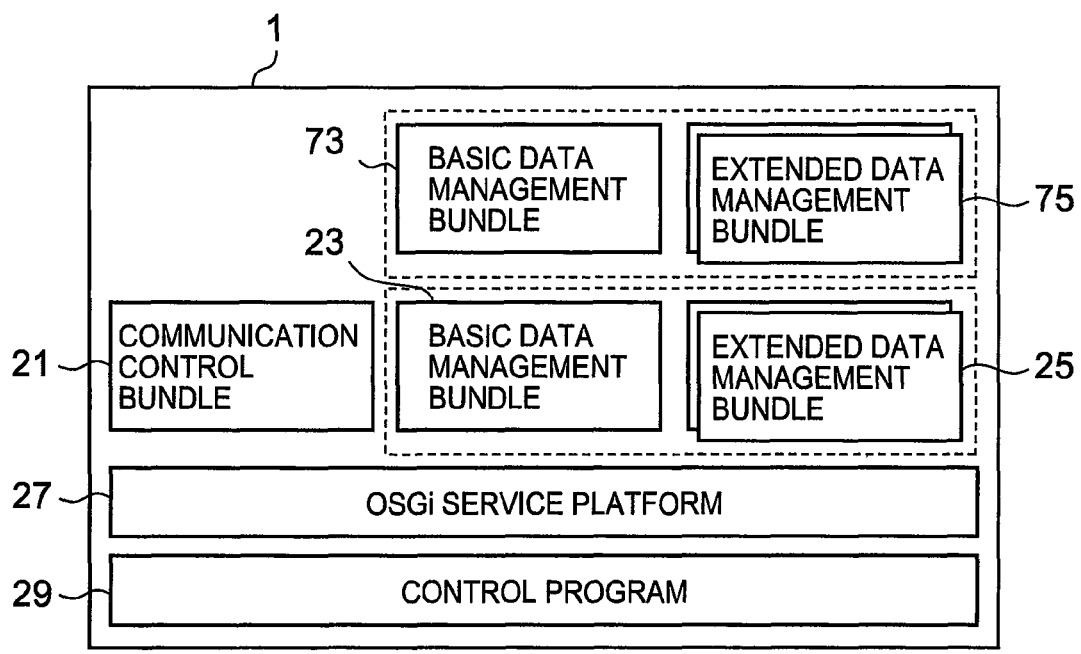
FIG. 7 is a diagram showing an example of the configuration of the processing programs that run on the CPU of a remotely managed device related another embodiment of the present invention.

FIG. 7 is a diagram showing an example of the configuration of processing programs that run on the CPU of the remotely managed device 300 related to the other embodiment of the present invention.

The configuration of the above-mentioned processing program, as shown in FIG. 7, differs from that of the processing program shown in FIG. 3 in that in addition to the basic data management bundle indicated by reference numeral 23, the above-mentioned processing program also comprises a basic data management bundle indicated by reference numeral 73, and in addition to the extended data management bundle indicated by reference numeral 25, the above-mentioned processing program also comprises an extended data management bundle indicated by reference numeral 75. Since the rest of the configuration is the same as the shown in FIG. 3, components that are the same as those shown in FIG. 3 will be assigned the same reference numerals in FIG. 7, and detailed explanations of these components will be omitted. The points of difference with the respective units shown in FIG. 6 and the respective units shown in FIG. 3 will be explained below.

The control program 29, for example, executes processing operations as a home router and processing operations as an STB by performing the functions (control functions) for controlling the operations of the main hardware (at the least the primary storage unit 3, the secondary storage unit 5, and the communication control unit 7 shown in FIG. 2). The communication control bundle 21 exchanges data with the two basic data management bundles 23, 73. The basic data, which is the management target of the basic data management bundle 23, is the above-mentioned first basic data, and the same processing operations as those explained using FIG. 3 are executed for this first basic data. Meanwhile, the basic data, which is the management target of the basic data management bundle 73, is the above-mentioned second basic data, and the same processing operations as those explained using FIG. 3 are executed for this second basic data. The extended data, which is the management target of the extended data management bundle 25, is the above-mentioned first extended data that is related to the above-mentioned first basic data, and the same processing operations as those explained using FIG. 3 are executed for this first extended data. Alternately, the extended data, which is the management target of the extended data management bundle 75, is the above-mentioned second extended data that is related to the above-mentioned second basic data, and the same processing operations as those explained using FIG. 3 are executed for this second extended data.

In the above-described other embodiment of the present invention (shown in FIG. 6 and FIG. 7), in a case where it is supposed, for example, that a remotely managed device equipped with both home router and STB functions is used as the remotely managed device 300, the basic data management bundle 23 manages the data group managed as the Baseline Profile defined in TR-098 as the first basic data, and the extended data management bundle 25 manages the data group managed as a Profile other than the above-mentioned Baseline Profile (an Ethernet (registered trademark) LAN Profile, or a WiFi LAN Profile) as the first extended data. Alternately, the basic data management bundle 73 manages the data group managed as the Baseline Profile defined in TR-135 as the second basic data, and the extended data management bundle 75 manages the data group managed as a Profile other than the above-mentioned Baseline Profile (a PVR Profile, or a IGMP Profile) as the second extended data. Furthermore, a plurality (two or more) of extended data management bundles 25 and extended data management bundles 75 may be installed in a single remotely managed device 300.

FIG. 8 is a flowchart showing an example of processing operations in the respective processing programs shown in FIG. 7 when a remote management server related to another embodiment of the present invention carries out a data set-up with respect to the remotely managed device.

In FIG. 8, first, either the remote management server 100 or the remote management server 700 creates a telegram for a data set-up instruction for the remotely managed device 300, and sends this data set-up instruction telegram (hereinafter, may also be expressed as the "data set-up instruction") to the remotely managed device 300 via the communication network 500 using the CWMP (Step S81).

Upon receiving the above-mentioned data set-up instruction telegram, the control program 29 extracts the above-mentioned data set-up instruction from the above-mentioned telegram, and outputs this extracted data set-up instruction to the communication control bundle 21 (Step S82). Upon inputting the above-mentioned data set-up instruction, the communication control bundle 21 determines which basic data management bundle (23, 73) has the basic data to which the above-mentioned data set-up instruction relates to as the management target, and determines which extended data management bundle (25, 75) has the extended data to which the above-mentioned data set-up instruction relates to as the management target. This determination process, for example, is carried out using the data name included in the above-mentioned data set-up instruction. For example, since the data name of data defined by the TR-098 always begins with "Internet Gateway Device." and the data name of data defined by the TR-135 always begins with "Device.STB Service.", the communication control bundle 21 carries out the above-mentioned determination processes using these names (Step S83).

The communication control bundle 21, based on the result of the determination process in Step S83, outputs the above-mentioned data set-up instruction to either the basic data management bundle 23 or the basic data management bundle 73. For example, in a case where the above-mentioned data name begins with "Internet Gateway Device.", the communication control bundle 21 outputs the above-mentioned data set-up instruction to the basic data management bundle 23. Further, in a case where the above-mentioned data name begins with "Device.STB Service.", the communication control bundle 21 outputs the above-mentioned data set-up instruction to the basic data management bundle 73 (Step S84). In a case where the above-mentioned data set-up instruction outputted from the communication control bundle 21 to the basic data management bundle 23 in Step S84, the same processing operations as those respectively shown in Step S44 through Step S49 of FIG. 4 are executed by the basic data management bundle 23. In this case, the processing operations respectively shown in Step S47 and Step S49 of FIG. 4 are executed in the extended data management bundle 25 (Step S85).

Next, the basic data management bundle 23 outputs to the communication control bundle 21 the result of the above-mentioned data set-up process and the coupling-destination data (the URL, ID and password of the remote management server 100) required for the remotely managed device 300 to carry out data communications with the remote management server 100. The above-mentioned result of the data set-up process, for example, is the result of the above-mentioned data set-up process in the processing operations respectively shown in either Step S45 or Step S46 of FIG. 4, or the processing result outputted from the extended data management bundle 25 in the processing operation shown in Step S49 of FIG. 4, or the determination result in a case where the above-mentioned data is determined not to belong to any Profile in the determination process of the same processing operation as that shown in Step S44 of FIG. 4 (Step S86).

In a case where the above-mentioned data set-up instruction is outputted from the communication control bundle 21 to the basic data management bundle 73 in Step S84, the same processing operations as those respectively shown in Step S44 through Step S49 of FIG. 4 are executed in the basic data management bundle 73. In this case, the processing operations respective shown in Step S47 and Step S49 of FIG. 4 are executed in the extended data management bundle 75 (Step S87).

Next, the basic data management bundle 73 outputs to the communication control bundle 21 the result of the above-mentioned data set-up process and the coupling-destination data (the URL, ID and password of the remote management server 700) required for the remotely managed device 300 to carry out data communications with the remote management server 700. The above-mentioned result of the data set-up process, for example, is the result of the above-mentioned data set-up process in the processing operations respectively shown in either Step S45 or Step S46 of FIG. 4, or the processing result outputted from the extended data management bundle 75 in the processing operation shown in Step S49 of FIG. 4, or the determination result in a case where the above-mentioned data is determined not to belong to any Profile in the determination process of the same processing operation as that shown in Step S44 of FIG. 4 (Step S88).

In accordance with either the processing result in Step S85 being outputted to the communication control bundle 21 via the processing operation shown in Step S86, or the processing result in Step S87 being outputted to the communication control bundle 21 via the processing operation shown in Step S88, the above-mentioned processing result is notified to the control program 29 from the communication control bundle 21 (Step S89). When this notification is inputted, the control program 29 creates a telegram related to the result of this set-up process, and sends the created telegram to either the remote management server 100 or the remote management server 700 via the communication network 500 (Step S90). Either the remote management server 100 or the remote management server 700 receives this telegram, and by executing the prescribed processing operations, ends the series of processing operations of the data set-up instruction related to the remotely managed device 300 shown in FIG. 8 (Step S91).

As explained hereinabove, the other embodiment of the present invention is also applicable to a device (the remotely managed device 300) that is equipped with two or more functions, making it possible to realize a remote management system comprising a remotely managed device that is capable of flexible operations.

The preferred embodiment of the present invention and variations thereof have been explained above, but these embodiments are merely examples for explaining the present invention, and do not purport to limit the scope of the present invention to this embodiment and variations. The present invention can also be put into practice via a variety of other modes.

What is claimed is:

1. A remotely managed device comprising a function which is coupled to a remote management server via a communication network, and which is a management target of the remote management server, comprising:
   a storage unit that stores a basic data management bundle that is a management program of basic data which is necessary for the remotely managed device executing basic processing of the function, an extended data management bundle that is a management program of extended data which is necessary for the remotely managed device expanding the function, and an OSGi service platform that is a management program of life cycles of each of the bundles; and
   a control unit configured to execute the programs stored in the storage unit, wherein:
      in the OSGi service platform, extended data, which each extended data management bundle can manage, is registered,
      as to instruction of data which is sent from the remote management server, the basic data management bundle executes processing for determining whether instruction target data is basic data or not,
      if the instruction target data is basic data, the basic data management bundle executes the instruction regarding the basic data; and
      if the instruction target data is not basic data, the basic data management bundle searches extended data registered in the OSGi service platform, and checks which of the extended data management bundles manages the instruction target data,
      if one of the extended data management bundles for managing the instruction target data is found, the instruction target data is output to the found extended data management bundle, and the extended data management bundle executes the instruction regarding the instruction target data.

2. A remotely managed device according to claim 1, wherein, if extended data management bundle for managing the instruction target data is not found, the result is returned by the basic data management bundle.

3. A remotely managed device according to claim 1, wherein the remotely management device further comprises a communication control bundle that, in accordance with a prescribed protocol, receives the data and related instruction from the remotely managed server.

4. A remotely managed device according to claim 3, wherein the prescribed protocol is a CPE WAN Management Protocol (CWMP).

5. A remotely managed device according to claim 3, wherein the remotely managed device has a plurality of functions, is connected to a plurality of remotely managed servers which are different for each of the plurality of functions, and has a combination of a basic data management bundle and an extended data management bundle for each of the plurality of functions, and
   wherein the communication control bundle specifies which of the plurality of functions the instruction regarding data received by any of the remotely managed servers corresponds to, and outputs the instruction to the basic data management bundle in the specified function.

6. A remotely managed device according to claim 5, wherein the basic data management bundle of any of the functions that received the instruction from the communication control bundle, in execution of the instruction regarding the instruction target data, outputs an execution result to the communication control bundle.

7. A remotely managed device according to claim 1, wherein either or both of the basic data management bundle and the extended data management bundle, in execution of the instruction regarding the instruction target data, outputs execution results to a transmission source of the instruction regarding the instruction target data.

8. A remotely managed device according to claim 1, wherein either or both of the basic data management bundle and the extended data management bundle, if the instruction regarding the instruction target data is executed by setting processing of data, makes a setting by own bundle or makes a setting to a control program for controlling an operation of the remotely managed device and receives a setting result from the control program which instructed the setting.

9. A remotely managed device according to claim 1, wherein either or both of the basic data management bundle and the extended data management bundle, in execution of the instruction regarding the instruction target data, checks whether there is a change in the instruction target data, and if there is a change, outputs a change value to a transmission source of the instruction regarding the instruction target data.

10. A remotely managed device according to claim 9, wherein either or both of the basic data management bundle and the extended data management bundle checks by its own bundle whether or not there is a change in the instruction target data, or inquires a control program for controlling operation of the remotely managed device.

* * * * *